United States Patent [19]
Findeis et al.

[11] Patent Number: 5,151,733
[45] Date of Patent: Sep. 29, 1992

[54] APPARATUS AND METHOD FOR COPYING PHOTOGRAPHIC MASTERS AT VARIABLE MAGNIFICATIONS

[75] Inventors: Günter Findeis, Sauerlach; Friedrich Jacob, Munich; Eberhard Schulz, Unterhaching, all of Fed. Rep. of Germany

[73] Assignee: Agfa-Gevaert Aktiengesellschaft, Leverkusen, Fed. Rep. of Germany

[21] Appl. No.: 759,891

[22] Filed: Sep. 13, 1991

[30] Foreign Application Priority Data

Oct. 2, 1990 [DE] Fed. Rep. of Germany ....... 4031111

[51] Int. Cl.$^5$ .............................................. G03B 13/28
[52] U.S. Cl. .......................................... 355/45; 355/77
[58] Field of Search ......................... 355/45, 20, 43, 77

[56] References Cited

U.S. PATENT DOCUMENTS

| | | | |
|---|---|---|---|
| 2,968,215 | 1/1961 | Goodman | 355/45 |
| 3,459,888 | 8/1969 | Sokolov | 355/45 X |
| 4,603,966 | 8/1986 | Brownstein | 355/45 |
| 4,627,719 | 12/1986 | Nitsch | 355/41 |

*Primary Examiner*—Richard A. Wintercorn
*Attorney, Agent, or Firm*—Peter K. Kontler

[57] ABSTRACT

Light is passed through a negative located in a primary optical path and towards a band of copy material disposed in the path. A reflector is movable into the primary path so as to deflect the light into a secondary optical path. A mat, transparent plate is situated in the secondary path. The plate is situated in a plane which is a conjugate of the plane of the copy material with reference to the reflector when the latter is in the primary path. A sharp image of the negative is formed on the plate. Light passing through the plate is deflected into a tertiary optical path by a second reflector. The light entering the tertiary path is sensed by a video camera which then causes the image on the plate to be reproduced on a monitor for evaluation prior to copying.

20 Claims, 2 Drawing Sheets

APPARATUS AND METHOD FOR COPYING PHOTOGRAPHIC MASTERS AT VARIABLE MAGNIFICATIONS

BACKGROUND OF THE INVENTION

The invention relates generally to the reproduction of a master or original.

More particularly, the invention relates to the reproduction of a photographic master or original using a copier with a device for varying the magnification of the image. The copier further includes a support for holding the master in a predetermined plane, and a reflector which is movable into the optical path so as to deflect light out of the latter. The deflected light travels to a transparent viewing surface where an image of the master, or of a portion of the master, is formed for evaluation. The viewing surface and the predetermined plane are conjugates with reference to the reflector in the optical path.

In many copiers, the magnification is adjusted by a variable objective which is designed so that the distance between the support for the master and the carrier for the copy material need not be changed when the magnification is altered. With appropriate design of the variable objective, it is also possible to magnify the master beyond the point where the entire image fits on the copy material, i.e., it is possible to copy a segment of the master such that the image of the segment fills the available area of the copy material. Another procedure which can be used to make copies which conform optimally to the wishes of a customer is to move the support for the master relative to the optical path in the image plane. This enables off-center segments of the master to be copied.

A problem which arises is that of properly evaluating the relationship between the segment to be reproduced and the size of the copy material available at that time. Known devices for performing the evaluation and making adjustments have a reflector which is movable into the optical path and is inclined at 45 degrees to the latter. The reflector directs the light in the optical path onto a mat plate which is disposed in a conjugate image plane and is marked to show the different sizes of the positives. An image of the segment is formed on the mat plate and can be viewed from externally. However, the outside light causes difficulties for copiers operated in bright rooms.

SUMMARY OF THE INVENTION

It is an object of the invention to provide an arrangement which makes it possible to evaluate an image of a master, or a segment of a master, even in the presence of outside light.

Another object of the invention is to provide a relatively economical arrangement for evaluating an image of a master or a segment thereof.

An additional object of the invention is to provide a relatively economical arrangement which, during adjustment of a copier preparatory to reproduction of a master or a segment of a master, allows an image of the master or the segment to be readily evaluated even in the presence of outside light.

A further object of the invention is to provide a method which enables an image of a master, or a segment of a master, to be evaluated even in the presence of outside light.

It is also an object of the invention to provide a method which makes it possible to evaluate an image of a master, or a segment of a master, relatively economically.

Yet another object of the invention is to provide a method which, during adjustment of a copier preparatory to reproduction of a master or a segment of a master, permits an image of the master or the segment to be readily evaluated in a relatively economical manner even in the presence of outside light.

The preceding objects, as well as others which will become apparent as the description proceeds, are achieved by the invention.

One aspect of the invention resides in a copier, particularly a photographic copier. The copier comprises means for supporting a master or original to be reproduced at a predetermined location; means for directing light along a first path, which includes the predetermined location, in a direction towards the latter; means for deflecting light from the first path into a second path, the deflecting means being movable between an operative position in the first path downstream of the predetermined location and an inoperative position out of the first path; means in the second path for forming an image of the master; and means for displaying the image at a second location removed from the second path.

The copier preferably further comprises means for varying the magnification of the image.

The copier may additionally include means for positioning copy material in the first or primary optical path adjacent to a predetermined plane and the forming means may include a viewing surface for the image. The viewing surface is then a conjugate of the predetermined plane with reference to the deflecting means when the latter is in its operative position. The viewing surface may be defined by a mat, transparent plate.

The displaying means may comprise a video camera. Preferably, the displaying means also comprises a monitor which is operatively associated with the camera.

Another aspect of the invention resides in a copying method, particularly for photographic masters or originals. The method comprises the steps of placing a master at a predetermined location; directing light along a first path, which includes the predetermined location, in a direction towards the latter; deflecting light from the first path into a second path master in the second path; and displaying the image at a second location removed from the second path.

The displaying step may include photographing the image.

The method may further comprise the step of positioning copy material in the primary optical path adjacent to a predetermined plane. The image may be formed on a surface which is a conjugate of such plane with reference to the location where light is deflected from the primary optical path into the second or auxiliary optical path.

The image is formed at a selected location of the auxiliary optical path, and the method may additionally comprise the step of deflecting light from the auxiliary optical path into a third or tertiary optical path downstream of the selected location so that the light in the tertiary optical path travels counter to the light in the primary optical path, i.e., so that the light in the tertiary optical path travels in a direction which is 180 degrees opposed to the direction of travel of the light in the primary optical path. The displaying step then includes detecting the light in the tertiary optical path.

The method may also comprise the step of displaying the available area of copy material at the same location as the image is displayed.

The video camera employed per the invention is directed towards the mat plate and reproduces, on the monitor of the invention, the entire segment of the master visible on the plate. Thus, if the available sizes of copy material are likewise exhibited on the monitor using appropriate techniques from the television industry, it becomes possible to observe the position of the segment on the copy to be made.

The novel features which are considered as characteristic of the invention are set forth in particular in the appended claims. The improved copying method, as well as the construction and mode of operation of the improved copier, will, however, be best understood upon perusal of the following detailed description of certain specific embodiments when read in conjunction with the accompanying drawings.

DESCRIPTION OF THE PREFERRED EMBODIMENTS

Figure 1:
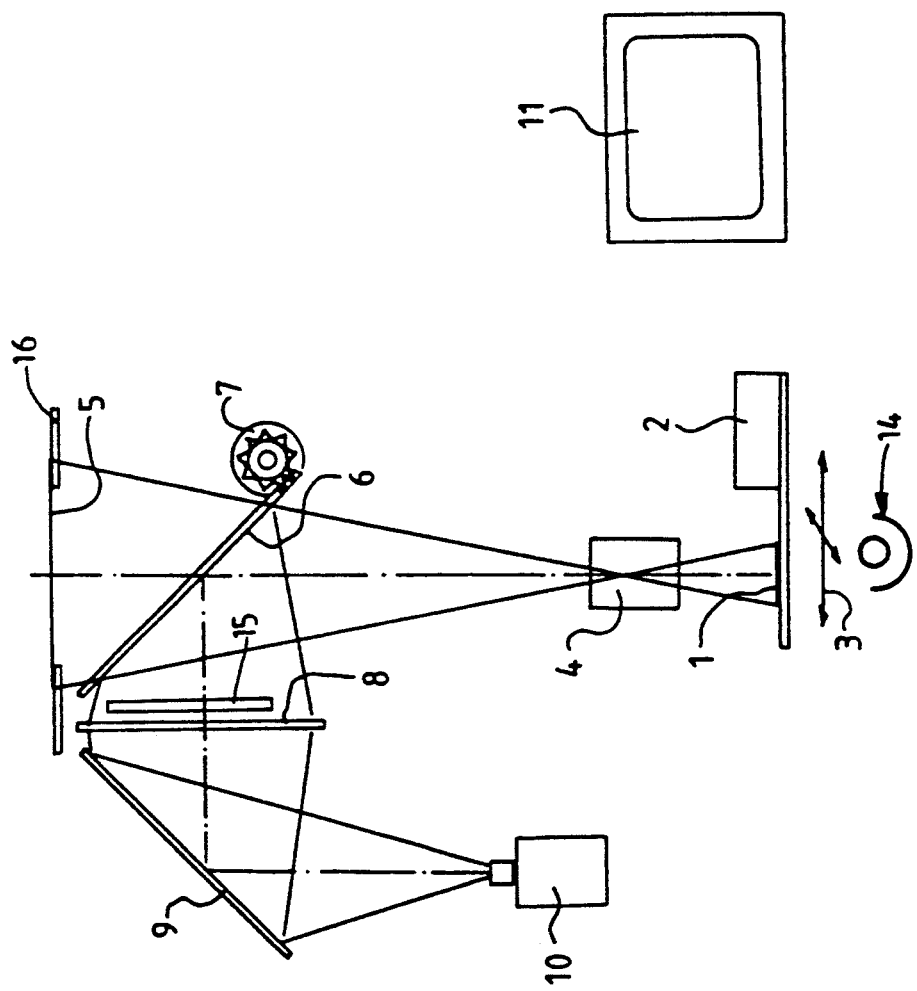
FIG. 1 schematically illustrates a copier in accordance with the invention.

FIG. 1 illustrates a copier for the reproduction of masters or originals, and it is assumed here that the copier is a photographic copier. The reference numeral 1 identifies a master or original to be reproduced and it is again assumed that the master 1 is a photographic master. For instance, the master 1 can be in the form of a length of exposed and developed film with negative images.

The reference numeral 2 indicates a support for the master 1, and the support 2 may take the form of a conventional copying platform or support. A source 14 of copy light is located below the support 2 in the showing of FIG. 1 and sends light along a primary optical path. The support 2 and the master 1 are disposed in the primary optical path. In the simplest case, the master 1 is placed on the support 2 by hand in the proper position relative to the margins of the area illuminated by the source 14.

The structure of the copier in the region of the support 2 can be in accordance with the teachings of the German Offenlegungsschrift 34 37 222. Here, a film to be reproduced is previously scanned to obtain density values. The film is drawn into a storage unit as scanning progresses until the entire film is in the storage unit. The positions of the image areas of the film, as well as the corresponding amounts of copy light, are calculated and the film is then advanced along a stage step-by-step and copied.

The support 2 is mounted on a carriage 3 which is movable in both the longitudinal and transverse directions of the support 2 as indicated by the double-headed arrows. This allows the support 2 to be moved out of a central position by a distance equal to one-half of the respective dimension of a standard 24×36 mm master. Furthermore, the support 2 can be rotated 90 degrees.

A variable objective 4 is situated above the support 2 in the showing of FIG. 1 and functions to adjust the magnification of an image of the master 1. The variable objective 4 sharply focuses an image of the plane of the master 1 in the path of copy material 5. A reflector 6 is arranged at a suitable location between the variable objective 4 and the copy material 5. The reflector 6 can be moved into and out of the primary optical path, which extends between the master 1 and the copy material 5, at an angle of 45 degrees to the primary optical path. In the illustrated embodiment, the reflector 6, which is disposed in a plane, is shiftable into and out of the primary optical path in such plane by a drive 7. The reflector 6 could also be pivotable.

During copying of a master, the copy material 5 is positioned in the primary optical path in or adjacent to a copying plane. A mat, transparent plate 8 is situated to one side of the primary optical path and is disposed in a plane which is a conjugate of the copying plane with reference to the reflector 6 when the latter is in the primary optical path. A Fresnel lens 15 is located adjacent to the plate 8. The Fresnel lens 15 is preferably situated in front or upstream of the plate 8 where it then acts as a field lens. Accordingly, a sharp image of the master 1 is formed on the plate 8 when the reflector 6 is located in the primary optical path since the reflector 6 deflects light from the primary optical path into the secondary or auxiliary optical path containing the plate 8 and the lens 15.

A second reflector 9 is disposed behind the plate 8 and serves to deflect light from the secondary optical path into a tertiary optical path. The light deflected into the tertiary optical path travels counter to the light in the primary optical path, that is, the reflectors 6 and 9 function to change the direction of travel of light impinging the same by 180 degrees. A video camera 10 is arranged in the tertiary optical path and has an objective which faces the reflector 9. The Fresnel lens 15 functions to somewhat focus the light which passes through the transparent plate 8 so that the light deflected into the objective of the video camera 10 by the reflector 9 can produce a reproduction on a television.

The video camera 10 is a very inexpensive black-and-white camera. The images picked up by the camera 10 are reproduced on a monitor 11 in a manner to be explained below.

Figure 2:
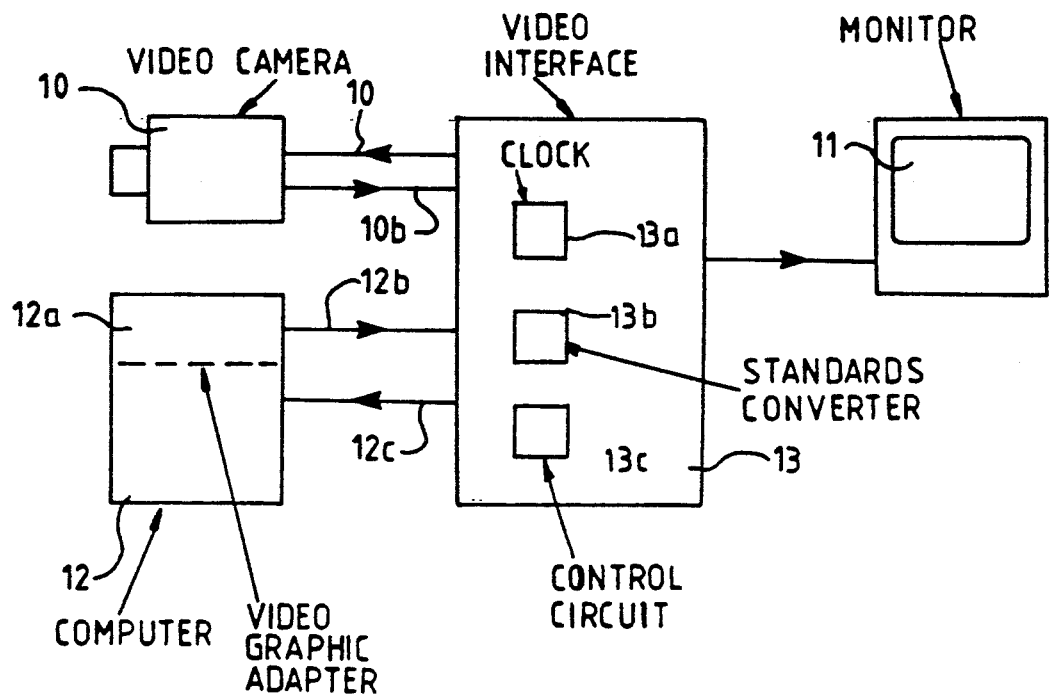
FIG. 2 is a block diagram showing additional details of the copier of FIG. 1.

The circuitry for reproducing the images detected by the camera 10 on the monitor is described with reference to FIG. 2. The camera 10 is connected to a first output of a video interface 13 by a conductor 10a for synchronizing pulses and to a first input of the interface 13 by a conductor 10b for video signals. A computer 12 is also connected to the interface 13. An operator or appropriate sensors in the copier give the computer 12 information on the width of the currently available copy material 5, the settings of the positive masks and/or the rotational position of the support 2, i.e., whether the support 2 is oriented longitudinally or transversely. The computer 12 has a video graphic adapter (VGA) 12a which is coupled to a second input of the interface 13 by a conductor 12b for the transmission of red, green and blue signals to the interface 13. The graphic adapter 12a is additionally coupled to a second output of the interface 13 via a conductor 12c for horizontal and vertical synchronizing pulses. The interface 13 has a third output which is connected to the monitor 11.

The interface 13 contains a pulse generator or clock 13a, a standards converter 13b and a control circuit 13c.

Figure 3:
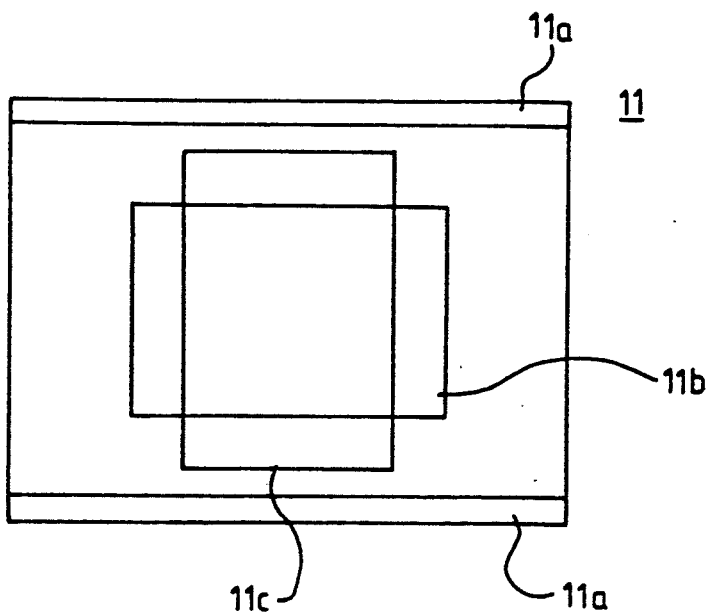
FIG. 3 shows various fields on the screen of a monitor constituting part of the copier of FIG. 1.

FIG. 3 schematically illustrates the superimposed representations visible on the screen of the monitor 1. The reference numeral 11a identifies the two regions at the top and bottom borders of the monitor 11 which cannot be used because of the unequal aspect ratios of the monitor screen and the master 1. The reference numeral 11b denotes the generally rectangular copying area which is available when using relatively narrow copy material with the support 2 oriented longitudinally while the reference numeral 11c identifies the usable copying area with the support 2 rotated by 90 degrees.

The operation of the copier is as follows:

The maximum size of the copy material 5 to be positioned in a platform or support 16 for positives or copies equals the size of that region of the plate 8 reproduced by the video camera 10 minus the marginal regions or strips 11a. Hence, when the objective 4 images the master 1 on copy material 5 of maximum size such that the image of the master 1 fills the available copying area of the material 5, the image of the master 1 likewise fills the corresponding copying area visible on the monitor 11.

The manner in which an image of the master 1, or of a segment of the master 1, is formed on the monitor 11 will now be explained. In this regard, it is pointed out that an object of the invention is to make such imaging as easy as possible for a user with minimum expense. To this end, the screen which is incorporated in the copier anyway to exhibit copying data generated by a processor is used to produce an image of the master 1. The monitor 11 is accordingly a conventional computer monitor and the video graphic adapter 12a of the computer 12 is a computer video graphic adapter.

Simple, conventional video cameras are not capable of producing image signals for computer monitors. Thus, the image signals must be transformed if the image of the master 1, together with the signals from the video graphic adapter 12a representing the available copying area, are to be made visible.

The procedures relating to the technical aspects of image reproduction by television will now be described. The reproduction of text, which was previously the exclusive purpose of the monitor 11, proceeds in the usual manner.

The monitor 1 is conventionally operated at a horizontal frequency of 31.5 kHz and a vertical frequency of 70 Hz. For the reproduction of the video image, the computer video graphic adapter 12a is switched to the graphic mode of 640 pixels ×480 lines. Among other things, the red, green and blue output signals of the graphic adapter 12a cause the interface 13 to adjust the outline of the available copying area. Following an EIA/VGA standards conversion, a negative/positive conversion and a graphic adjustment, the camera video signal arrives at the monitor 11. The latter is now operated at a horizontal frequency of 31.5 kHz and a vertical frequency of 60 Hz.

To make the copying area which is available on the copy material 5 or positive visible on the monitor 11, the appropriate rectangular area 11b or 11c is exhibited on the monitor 11. The size of the rectangular area 11b or 11c depends upon the mask opening —horizontal or vertical —and the width of the copy material 5 and is established by inputting the nominal size into the configuration channel memory of the copier. When the mask opening is a maximum, the rectangular area 11b or 11c extends across the full width of the image. Due to the fact that the aspect ratio of 4:3 for a television image differs from the aspect ratio of 4:2.66 for a small format image, the maximum image height cannot be achieved. The marginal strips 11a which are generally excluded from the image on the monitor 11 represent the difference between the attainable image height and the maximum image height.

In order that the rectangular areas 11b, 11c generated by the computer 12 may be mixed with the video images, the respective signals must satisfy the same standard and be synchronous. However, the video graphic adapter 12a, which constitutes the signal source for the rectangular areas 11b and 11c, cannot be synchronized and also does not satisfy any television standard. Accordingly, it is necessary to change the standard for the video camera signals, i.e., to synchronize these signals with the VGA signals. The computer video graphic adapter 12a has 640×480 image points and operates at a horizontal frequency of 31.5 kHz and a vertical frequency of 60 Hz. This corresponds to 480 lines per image in 16.6 msec. On the other hand, the video camera 10 with its EIA standard operates at a horizontal frequency of 15.75 kHz and a vertical frequency of 60 Hz which corresponds to 242 lines per half image in 16.6 msec. Due to this difference, the interface 13 includes, in addition to the clock 13a, the standards converter 13b for the video signals of the camera 10. As indicated earlier, the interface 13 also includes the control circuit 13c, and the latter functions to equalize the intensities of the signals from the computer 12 and the video camera 10 at the monitor 11.

The clock 13a generates all of the control signals required for operation of the circuitry, as well as the synchronizing pulses for the video camera 10 and the monitor 11. The oscillator of the clock 13a is synchronized by the horizontal synchronizing signal of the video graphic adapter 12a via an appropriate circuit. The pulses necessary for syntony of the horizontal and vertical deflections are derived from decoding 10 or 11 bit counters. The vertical synchronizing signals of the video graphic adapter 12a regulate the cycles of the vertical counter.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the instant contribution to the art and, therefore, such adaptations should and are intended to be comprehended within the meaning and range of equivalence of the appended claims.

What is claimed is:

1. A copier, particularly a photographic copier, comprising means for supporting a master to be reproduced at a predetermined location; means for directing light along a first path, which includes said predetermined location, in a direction towards the latter; means for deflecting light from said first path into a second path, said deflecting means being movable between an operative position in aid first path downstream of said predetermined location and an inoperative position out of said first path; means in said second path for forming an image of the master; means for displaying the image at a second location removed from said second path; and means for positioning copying material in said first path adjacent to a predetermined plane.

2. The copier of claim 1, for wherein aid forming means comprises a viewing surface for the image, said surface being a conjugate of said plane with reference to said deflecting means when the latter is in said operative position.

3. The copier of claim 1, further comprising means for varying the magnification of the image.

4. The copier of claim 1, wherein said forming means comprises a mat, transparent plate.

5. The copier of claim 1, wherein said displaying means comprises a video camera.

6. The copier of claim 5, wherein said displaying means further comprises a monitor which is operatively associated with said camera.

7. A copier, particularly a photographic copier, comprising means for supporting a master to be reproduced at a predetermined location; means for directing light along a first path, which includes said predetermined location, in a direction towards the later; means for deflecting light from said first path into a second path, said deflecting means being movable between an operative position in said first path downstream of said predetermined location and an inoperative position out of said first path; mean sin said second path for forming an image of the master, said forming means comprising a Fresnel lens; and means for displaying the image at a second location removed from said second path.

8. A copier, particularly a photographic copier, comprising means for supporting a master to be reproduced at a predetermined location; means for directing light along a first path, which includes said predetermined location, in a direction towards the latter; means for deflecting light from said first path into a second path, said deflecting means being movable between an operative position in said first path downstream of said predetermined location and an inoperative position out of said first path; transparent means in said second path for forming an image of the master; means for displaying the image at a second location removed from said second path; and second deflecting means in said second path downstream of said forming means, said second deflecting means being arranged to deflect light from said second path into a third path such that the light in said third path travels counter to the light in said first path.

9. The copier of claim 8, wherein said displaying means comprises a video camera in said third path.

10. The copier of claim 9, wherein said camera is a black-and-white video camera, and said displaying means further comprises a computer monitor operatively associated with said camera.

11. The copier of claim 10, wherein said displaying means further comprises a video interface having input means coupled to said camera and output means coupled to said monitor.

12. The copier of claim 11, wherein said displaying means further comprises a computer having a video graphic adapter for exhibiting on said monitor the available area of copy material, said interface having second input means coupled to said computer.

13. The copier of claim 12, wherein said interface comprises clocking means for synchronizing said camera and said monitor.

14. The copier of claim 13, wherein said adapter comprises means for generating horizontal synchronizing signals for said clocking means.

15. The copier of claim 13, wherein said interface further comprises a standards converter and a control circuit.

16. A copying method, particularly for photographic masters, comprising the steps of placing a master at a predetermined location; directing light along a first path, which includes said predetermined location, in a direction towards the latter; deflecting light from said first path into a second path downstream of said predetermined location; forming an image of said master in said second path; displaying said image at a second location removed from said first path; and positioning copy material in said first path adjacent to a predetermined plane.

17. The method of claim 16, wherein the deflecting step is performed at an additional location of said first path; said image being formed on a surface which is a conjugate of said plane with reference to said additional location.

18. The method of claim 16, wherein said image is formed at a selected location of said second path; and further comprising the step of deflecting light from said second path into a third path downstream of said selected location so that the light in said third path travels counter to the light in said first path, the displaying step including detecting the light in said third path.

19. The method of claim 16, wherein the displaying step comprises photographing said image.

20. The method of claim 16, further comprising the step of displaying the available area of copy material at said second location.

* * * * *